Figure 1:
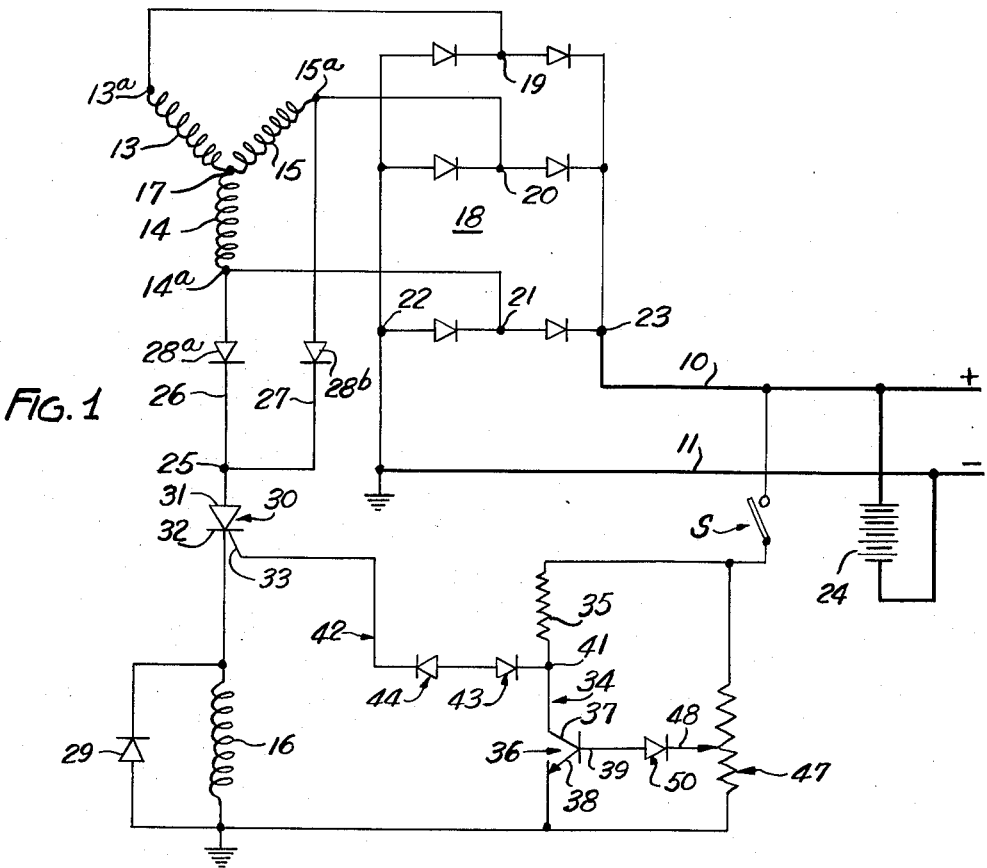

Jan. 18, 1966     W. M. HALLIDY     3,230,443
VOLTAGE REGULATOR FOR GENERATORS
Filed April 12, 1962

INVENTOR.
WILLIAM M. HALLIDY
BY Williams, David,
Hoffmann & Yount.
ATTORNEYS

United States Patent Office 3,230,443
Patented Jan. 18, 1966

3,230,443
VOLTAGE REGULATOR FOR GENERATORS
William M. Hallidy, Glendora, Calif., assignor to The Leece-Neville Company, Cleveland, Ohio, a corporation of Ohio
Filed Apr. 12, 1962, Ser. No. 187,122
17 Claims. (Cl. 322—28)

The present invention relates to electrical generating systems and, more particularly, to the control circuits for regulating the output of the system.

An important object of the present invention is to provide a new and improved regulating system for a generating machine which is adapted to regulate the output thereof in accordance with an electrical output condition, and in which a condition-sensing circuit includes a voltage breadown device, such as a Zener diode, which switches between two states of conduction as the condition varies between two levels, to control the voltage drop across a second voltage breakdown device to switch the second voltage breakdown device between conductive and nonconductive states to control the output of the machine.

Another object of the present invention is to provide a new and improved regulating system for a generating machine in which the control current circuit for a controlled rectifier is switched on and off to control the output of the machine and which includes a voltage breakdown device having a voltage thereacross at normal operating voltages rendering the device conductive and control means responsive to a voltage varying with the electrical output of the machine to switch the voltage drop across the breakdown device to a magnitude below the potential at which it becomes nonconductive.

Still another object of the present invention is to provide a new and improved regulating system for a generating machine in which the gate current for a controlled rectifier for controlling the output of the machine is switched on and off by changing the voltage drop across a voltage breakdown device in the gate current circuit through the operation of a second voltage breakdown device which is responsive to the electrical output condition to be controlled.

A still further object of the present invention is to provide a new and improved regulating system for a generating machine wherein a Zener diode or other voltage breakdown device is normally conductive to effect an increase in the output of the machine and wherein the breakdown device is rendered nonconductive, when the electrical output of the machine reaches a level where the output thereof is to be decreased, by changing conductivity of a transistor connected into a circuit for applying a potential across the voltage breakdown device.

A still further object of the present invention is to provide a new and improved switching circuit for switching the control current to a controlled rectifier off and on in response to the variations of a voltage between two levels and wherein the control current for the rectifier flows through a voltage breakdown device which is switched off and on in response to variations of the voltage.

Figure 2:
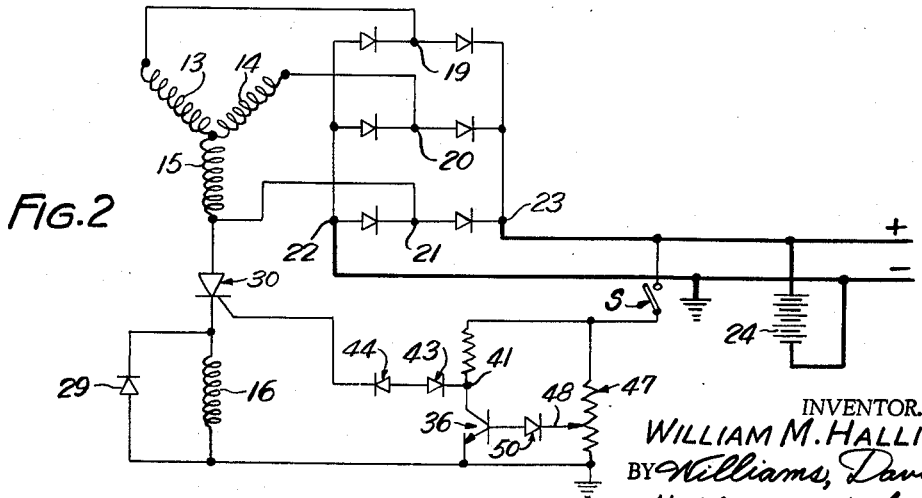

Further objects and advantages of the present invention will be apparent from the following detailed description thereof made with reference to the accompanying drawings forming a part of the present specification for all matter shown therein and in which:

FIG. 1 is a schematic diagram of a generating machine and a control circuit therefor embodying the present invention; and FIG. 2 is a schematic electrical diagram of a modified generating system.

In the preferred embodiment of the present invention illustrated in FIG. 1 of the drawings, electrical power is supplied to D.C. conductors 10, 11 from a generating machine illustrated schematically as a three-phase alternator having Y connected phase of inductor windings 13, 14, 15 and a field winding 16. The phase or inductor windings have a common junction 17 and phase terminals 13a, 14a, 15a and are connected to the conductors 10, 11 through a full wave rectifier 18. The rectifier 18 has input terminals 19, 20, 21, each connected to a respective one of the phase winding terminals 13a, 14a, 15a and output terminals 22, 23 connected to the conductors 10, 11. A battery 24 is connected across the conductors 10 and 11 and the conductors may supply power to other loads connected thereacross.

The field winding 16 is energized by rectified current derived from the A.C. side of rectifier 18. To this end, the phase winding terminals 14a, 15a are connected to a junction 25 by respective connections 26, 27 having rectifiers 28a, 28b, respectively, therein for passing current flowing from the phase winding terminals to the junction 25. The junction 25 is connected to the anode 31 of a controlled rectifier 30 with the cathode 32 of the controlled rectifier 30 being connected to one side of the field 16 to supply current thereto. The other side of the field 16 is connected to the output terminal 22 of the rectifier 18, the terminal 22 being ground in the illustrated system. When either the phase winding terminal 15a or the phase winding terminal 14a is positive with respect to ground, the connection 26 or the connection 27 will apply this voltage to the junction 25 and if the controlled rectifier is conductive, current will flow in the field winding 16. When both of the phase winding terminals 14a, 15a are negative with respect to ground, current flow is blocked in the winding 16 by the rectifiers 28a, 28b as well as by the action of the controlled rectifier 30. Preferably, the field winding 16 is shunted by a rectifying diode 29 which is poled to conduct current due to the "inductive kick" in the winding 16 when the energizing current therein is switched off.

As will be understood by those skilled in the art, a controlled rectifier is a solid state, semiconductor device which will present a high impedance to current flow from the anode to the cathode but which become conductive when a predetermined voltage is applied across the anode and cathode and a control current established between the cathode 32 and a gate electrode 33. Under these conditions, an avalanche breakdown occurs and the resistance to current betwen the anode and cathode becomes small. In a controlled rectifier, the voltage at which the avalanche breakdown occurs is controlled by current flowing between the gate electrode of the device and the cathode of the device. After the breakdown occurs, the gate electrode may lose control of the device so that the device will continue to be conductive until the voltage between the anode and cathode is reduced below a critical potential which may be defined as the extinguishing potential of the device. In one type of controlled rectifier, however, a reverse current can be made to flow between the cathode and gate electrode to cause the device to extinguish itself. In the latter type of device, the gate or control electrode loses control of the magnitude of current between the anode and cathode but can be used to stop the current flow by reversing the current between the gate or control electrode and the cathode. The characteristics of controlled rectifier are more fully described in my Patent No. 3,009,091, issued November 14, 1961, and reference is made thereto for details not set out herein.

In the illustrated embodiment, a control current circuit for the controlled rectifier 30 is connected across part of a voltage-dividing network 34 which is connected across the conductors 10, 11. The voltage-dividing network includes a resistor 35 having one end connected to the positive conductor 10 by a switch S and its other end connected to ground through the collector-emitter circuit of a transistor 36. The transistor 36 is shown as an NPN transistor and has a collector 37, an emitter 38 and a base 39. The gate electrode 33 of the controlled rectifier 30 is connected to the voltage-dividing circuit 34 at a junction 41 between the resistor 35 and the transistor 36 by a connection 42 including a voltage breakdown device, preferably a Zener diode 43, and a gate-protecting diode 44 connected in the gate circuit in a forward direction to pass current flowing from the junction 41 of the divider 34 to the gate electrode 33. The circuit constants are such that for normal operating voltages of the system, the junction 41 is at a voltage, when the transistor 36 is cut off, i.e., nonconductive, which is sufficient high to cause the Zener diode 43 to break down and to conduct current from the junction 41 to the gate electrode 33 to render the controlled rectified 30 effective to pass current to the field 16, once the voltage between its anode and cathode exceeds the critical firing voltage determined by the control current. In the critical firing voltage determined by the control current. In the absence of a current to the gate electrode 33, the controlled rectifier will not break down to conduct between its anode and cathode.

The transistor 36 is normally maintained in a cut off condition but when the output voltage of the machine rises to a predetermined level, the transistor 36 is switched to a conductive condition to lower the voltage of the junction 41 and extinguish the Zener diode 43. This cuts off the gate current in the controlled rectifier 33 so that when the voltage between the anode and cathode of the rectifier drops to zero, the rectifier will have become nonconductive and the controlled rectifier will block current flow from the phase winding terminals 14a, 15a to the field 16.

To switch the transistor 36 off and on at the proper times, the voltage across the conductors 10, 11 is sensed by voltage-sensing means comprising a voltage-dividing network including a potentiometer 47 connected between the conductor 10 and ground and having a slidable tap 48 connected to the base of the transistor 36 through a voltage breakdown device, preferably a Zener diode 50, which effectively blocks current flow to the base until a predetermined voltage is exceeded between the tap 48 and ground. When the voltage drop between the sliding tap 48 and ground 11 causes the diode 50 to break down, input current flows in the base circuit of the transistor 36. The Zener diode 50 will break down to conduct current when the output voltage appearing on the conductors 10, 11 is increased to a predetermined level depending upon the setting of the tap 48.

In operation, the circuit operates to regulate the output of the generating at high and low levels of the voltage appearing across the potentiometer 47. The tap 48 on the potentiometer 47 is set so that when the higher level is reached, the Zener diode 50 breaks down to conduct base current to the transistor 36 to render the latter conductive. When the transistor 36 is conductive, the potential of junction 41 in the voltage divider 34 is lowered and the Zener diode 43 is extinguished to block gate current to the controlled rectifier gate electrode 33. Once the gate current to the controlled electrode 33 is blocked, the controlled rectifier 30 will extinguish and cease to conduct current to the field 16 when the potential between the anode and cathode drops to zero. The potential between the anode and cathode will drop to zero once during each cycle of the alternator since the field is energized from the A.C. side of the rectifier 30. The Zener diode 43 will remain nonconductive until the voltage on the conductors 10, 11 drops to the extinguishing potential for the Zener diode 50. When this voltage level is reached, the Zener diode 50 will cease to conduct, the base current to the transistor 36 will be blocked, the potential of junction 41 will be raised and the zener diode 43 will break down to the conduct current to the gate electrode 33. With current flowing in the gate control circuit, the controlled rectifier will break down as soon as the voltage across the anode-cathode reaches a predetermined magnitude. If the voltage of phase windings, 14, 15 is at the necessary magnitude when the gate current is established, the controlled rectifier will break down immediately.

From the foregoing, it can be seen that the Zener diode 43 is switch on and off by the Zener diode 50 and the transistor 36 to control the gate-control current flowing through the Zener diode 43. The transistor 36 controls the voltage drop across the Zener diode 43, the Zener diode 43 being conductive with the transistor 36 in a cut-off state. The transistor 36 is switched on by the Zener diode 50 when the voltage of the machine reaches its higher level of regulation to drop the voltage across the Zener diode 43 to thereby switch off the diode 43 and the gate-control current. The diode 43 and the gate-control current are maintained off until the transistor 36 is again cut off by the switching of the Zener diode 50 to its nonconductive state when the voltage across the conductors 10, 11 drops to its extinguishing potential.

While the voltage sensed by the Zener diode 50 varies in accordance with the output voltage of the machine, it will be apparent to those skilled in the art that the voltage drop across the potentiometer 47 could be a measure of the current flowing in the output circuit of the generating system and the system could than operate as a control system for regulating the output of the generating system in response to current flow.

From the foregoing, it can be readily appreciated that the output of the generating system is controlled by the Zener diodes 43, 50 which operate to switch off and on the control current to the controlled rectifier 30 to, in turn, switch the field current off and on.

When the generating system is a generating system for an automobile, the switch S may be contacts on the ignition switch which are open when the ignition is off. The switch S may also be the contacts of a conventional load relay. It will be noted that during starting, the current in the gate circuit will help the machine come up to voltage.

The circuit shown in FIG. 2 of the drawings is substantially the same as FIG. 1 and the circuit elements thereof which correspond to the circuit elements of FIG. 1 have been given the same reference numerals as the elements of FIG. 1. The circuit in FIG. 2 differs from that of FIG. 1 in that only the phase winding terminal 14a is connected to the anode of the controlled rectifier 30. Consequently, the anode of the controlled rectifier 30 will only have a positive potential applied thereto relative to the base potential when the base terminal 14a is positive with respect to ground rather than when the base terminal 14a or 15a is positive with respect to ground as in the preceding embodiment. Consequently, the period during the cycle of the alternator during which the anode of the controlled rectifier 30 is positive with respect to the cathode will be a shorter period than in the case of the embodiment of FIG. 1. While the illustrated systems are D.C. generating systems, it will be appreciated that the output of the alternator could be an A.C. output and necessary rectifying elements could be provided for establishing the proper potentials across the potentiometer 47 and the voltage-dividing network 34.

It will now be appreciated that the foregoing objects and others have been accomplished and that the present invention provides a new and improved regulating system wherein a control current flowing in a control current circuit including a voltage breakdown device is switched on and off in response to voltage variations by a second voltage breakdown device which controls the potential drop across the Zener diode or voltage breakdown device in the control circuit and that normally the voltage breakdown device in the control circuit is conductive until a predetermined voltage magnitude is reached and then the voltage breakdown device, sensitive to the control voltage is switched to change the voltage drop across the Zener diode or voltage breakdown device in the control circuit to switch the control current off.

While preferred embodiments of the present invention have been described in detail, it is hereby my intention to cover all embodiments, modifications, constructions and arrangements which fall within the ability of those skilled in the art and within the scope and spirit of the appended claims.

Having described my invention, I claim:

1. In an electrical generating system, a generating machine having an output to be controlled at high and low output levels, means deriving a control voltage which varies with said output, a control circuit in which the current is to be switched on and off at respective ones of said levels to control said output, a first voltage breakdown device in said circuit having current conductive and nonconductive states depending on the voltage thereacross and in which state the control current in the circuit is respectively on and off, circuit means for applying a first voltage across said control circuit to render said device conductive, said circuit means including a second voltage breakdown device responsive to said control voltage for lowering the voltage across said control circuit to switch said first voltage breakdown device to one state when said control voltage reaches a first predetermined magnitude corresponding to the high output level and re-establishing said first voltage to switch said first voltage breakdown device to its other state when said control voltage drops to a predetermined magnitude below said first predetermined magnitude and corresponding to said low output level.

2. In an electric generating system as defined in claim 1 wherein said circuit means comprises an electric valve device having principal electrodes connected across said control circuit and a control electrode connected in circuit with said second voltage breakdown device, said second voltage breakdown device switching between conductive and nonconductive states in response to said control voltage to switch the impedance between said principal electrodes between two states to switch said first voltage breakdown device between conductive and nonconductive states.

3. In an electric generating system as defined in claim 1 wherein said second circuit means comprises a transistor having principal electrodes connected to control the voltage across said control circuit and a base electrode connected in circuit with said second voltage breakdown device, said second voltage breakdown device switching said transistor between conductive and nonconductive states upon the switching of said second voltage breakdown between conductive and non-conductive states.

4. In an electric generating system as defined in claim 3 wherein said transistor is connected across said control circuit.

5. In an electric generating system, a generating machine having an output to be controlled at high and low output levels and a field winding whose energization controls said output, means providing a control voltage which varies with said output and has first and second levels corresponding to said high and low output levels, a control circuit in which the current is switched on and off to control the energization of said winding, said circuit including a first voltage breakdown device adapted to break down and become conductive when a predetermined voltage is established thereacross and to extinguish and become non-conductive at a predetermined lower voltage, and circuit means for applying a first voltage across said control circuit to render said device conductive, said circuit means including a second voltage breakdown device which switches between conductive and non-conductive states in response to said control voltage for lowering the voltage across said control circuit when said control voltage reaches said first level to render said first breakdown device nonconductive and re-establishing said first voltage when said control voltage drops to its second level to switch said first voltage breakdown device to its conductive condition.

6. In an electric generating system as defined in claim 5 wherein said circuit means comprises an electric valve device having principal electrodes connected across said control circuit and a control electrode connected in circuit with said second voltage breakdown device, said second voltage breakdown device switching between conductive and nonconductive states in response to said control voltage to switch the impedance between said principal electrodes between two states to switch said first voltage breakdown device between conductive and nonconductive states.

7. In an electric generating system, a generating machine having an output to be controlled between maximum and minimum levels, means deriving a control voltage which varies with said output and which has first and second levels corresponding to said maximum and minimum levels respectively, a solid state device of the avalanche type switchable between conductive and nonconductive states and having principal electrodes and a control electrode, circuit means connecting said device in circuit with a current-responsive element to effect control of said output on the switching on and off of current between said principal electrodes as said device switches between conductive and nonconductive states and for establishing a voltage across said principal electrodes which periodically reduces to zero, said control electrode being adapted to have a current signal applied thereto to effect a switching of said device to its conductive state upon the establishing of a firing voltage across said principal electrodes, a control circuit for supplying said current signal to said device including a first voltage breakdown device switchable between conductive and nonconductive states depending on the voltage thereacross to switch said current signal on and off, and second circuit means for establishing a voltage across said control circuit to effect a breakdown of said first voltage breakdown device, said second circuit means including a second voltage breakdown device responsive to said control voltage and which switches from a nonconductive condition to a conductive condition when said control voltage reaches said first level to lower the voltage across said control circuit when said control voltage reaches said first level to switch said first breakdown device off and which switches to a nonconductive state to re-establish the higher voltage when said control voltage drops to a said second level to switch said first voltage breakdown device to its conductive state.

8. In an electric generating system as defined in claim 7 wherein said second circuit means comprises an electric valve having principal electrodes connected to control the voltage across said control circuit and a control electrode connected in circuit with said second voltage breakdown device, said second voltage breakdown device switching between conductive and nonconductive states in response to said control voltage to switch the impedance between the principal electrodes of said valve between two states to switch said first voltage breakdown device between conductive and nonconductive states. \

9. In an electric generating system as defined in claim 8 wherein said second circuit means comprises a transistor having principal electrodes connected to control the voltage across said control circuit and a base electrode connected in circuit with said second voltage breakdown device, said second voltage breakdown device switching said transistor between conductive and nonconductive states upon the switching of said second voltage breakdown device between conductive and nonconductive states.

10. In an electric generating system as defined in claim 8 wherein said transistor is connected across said control circuit.

11. In an electric generating system, a generating machine having phase windings and a field winding, circuit means connecting said phase windings to apply a rectified voltage to said field winding which periodically reduces to zero, said circuit means including a solid state device of the avalanche type having principal electrodes connected in series with said field winding and a control electrode adapted to receive a direct current signal of one sense to initiate firing of said device when a firing voltage is across its principal electrodes, said device being of the type which is self-extinguishing when the voltage across the principal electrodes reduces to zero, a control circuit connected to said control electrode to provide said signal including a first voltage breakdown device in which said signal flows and having conductive and nonconductive states to switch said signal off and on depending on the voltage thereacross, and circuit means for applying a voltage across said first voltage breakdown device to render said device conductive, said circuit means including a second voltage breakdown device switched between states in response to said control voltage for lowering the voltage across said first voltage breakdown device to switch said first voltage breakdown device off on the switching of said second voltage breakdown device to its conductive state when said control voltage reaches a first predetermined magnitude and re-establishing the higher voltage when said control voltage drops to a predetermined magnitude below said first predetermined magnitude to switch said second device to its conductive state when said second breakdown device is switched to its nonconductive state.

12. In an electric generating system as defined in claim 11 wherein said circuit means comprises an electric valve device having principal electrodes connected across said control circuit and a control electrode connected in circuit with said second voltage breakdown device, said second voltage breakdown device switching between conductive and nonconductive states in response to said control voltage to switch the impedance between said principal electrodes between two states to switch said first voltage breakdown device between conductive and nonconductive states.

13. In an electric generating system as defined in claim 11 wherein said circuit means comprises a transistor having principal electrodes connected to control the voltage across said control circuit and a base electrode connected in circuit with said second voltage breakdown device, said second voltage breakdown device switching said transistor between conductive and nonconductive states upon the switching of said second voltage breakdown device between conductive and nonconductive states.

14. In an electric generating system as defined in claim 13 wherein said transistor is connected across said control circuit.

15. In a switching system, a first circuit in which a current-responsive control element is to be switched on and off as a control voltage reaches lower and upper levels, a voltage breakdown device in said circuit presenting a high impedance to effectively block current flow in one direction when nonconductive and becoming conductive and presenting a low impedance to current flow in said one direction when a predetermined voltage is applied thereacross, circuit means for establishing a first voltage across said first circuit to effect a breakdown of said voltage breakdown device and render the latter conductive to current flow in said one direction, said circuit means including an impedance device actuatable from a first state in which said first voltage is applied to said first circuit to a second state in which a voltage of insufficient magnitude to maintain said breakdown device in a conductive condition is applied to said circuit, said impedance device comprising a solid state device having principal electrodes connected into said circuit means and a control electrode for controlling the conductivity of said solid state device, and circuit means for applying said control voltage to said control electrode including a second voltage breakdown device having conductive and nonconductive states depending on the magnitude of said control voltage and responsive to said control voltage to switch between said conductive and nonconductive states to effect a switching of said impedance device to switch said first mentioned voltage breakdown device between conductive and nonconductive states.

16. In a switching system a first circuit in which the current is to be effectively switched on and off, a voltage breakdown device in said circuit, a source of potential, a voltage-dividing network connected across said potential and including a transistor having principal electrodes connected into said voltage-dividing network and a control electrode and adapted to be switched between conductive and nonconductive states in response to a current signal, means connecting said first circuit across a portion of said network to provide a first voltage effective to render said breakdown device conductive when said transistor is in one state of conduction and a second voltage insufficient to maintain said breakdown device conductive when said transistor is in its other state of conduction, means providing a control voltage and connecting said control voltage to said control electrode including a second voltage breakdown device responsive to said control voltage to establish and block current to said base to switch said transistor between its conductive and nonconductive states as said control voltage varies between its levels to cause said first mentioned voltage breakdown device to switch between nonconductive and conductive states.

17. A switching system as defined in claim 16 wherein the system includes a semiconductor device of the avalanche type having an anode, a cathode, and gate electrode for initiating the firing of the device and said gate electrode and cathode are connected into said first circuit.

References Cited by the Examiner
UNITED STATES PATENTS 2,980,843   4/1961   Conger et al. _____ 322—73
3,009,091   11/1961  Hallidy _____ 322—73

LLOYD McCOLLUM, *Primary Examiner.*